United States Patent
Kelleher et al.

(10) Patent No.: US 9,477,597 B2
(45) Date of Patent: Oct. 25, 2016

(54) TECHNIQUES FOR DIFFERENT MEMORY DEPTHS ON DIFFERENT PARTITIONS

(75) Inventors: Brian Kelleher, Palo Alto, CA (US); Emmett Kilgariff, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 1011 days.

(21) Appl. No.: 13/072,020

(22) Filed: Mar. 25, 2011

(65) Prior Publication Data
US 2012/0246379 A1 Sep. 27, 2012

(51) Int. Cl.
| | |
|---|---|
| G09G 5/39 | (2006.01) |
| G06F 12/06 | (2006.01) |
| G09G 5/36 | (2006.01) |
| G09G 5/395 | (2006.01) |
| G09G 5/393 | (2006.01) |
| G06T 1/60 | (2006.01) |

(52) U.S. Cl.
CPC ............. *G06F 12/0607* (2013.01); *G06T 1/60* (2013.01); *G09G 5/363* (2013.01); *G09G 5/39* (2013.01); *G09G 5/393* (2013.01); *G09G 5/395* (2013.01)

(58) Field of Classification Search
CPC ........ G09G 5/393; G09G 5/39; G09G 5/363; G09G 5/395; G06T 1/60
USPC .............. 345/544, 568, 566, 536, 530, 501; 711/118, 154, 165, 103, 173, 170; 365/200, 201, 225.7; 714/42
See application file for complete search history.

(56) References Cited

U.S. PATENT DOCUMENTS

| | | | |
|---|---|---|---|
| 5,553,023 A * | 9/1996 | Lau et al. ................ | 365/189.14 |
| 5,594,854 A | 1/1997 | Baldwin et al. | |
| 5,623,692 A | 4/1997 | Priem et al. | |
| 5,664,162 A | 9/1997 | Dye | |
| 5,701,438 A | 12/1997 | Bains | |
| 5,854,631 A | 12/1998 | Akeley et al. | |
| 5,854,637 A | 12/1998 | Sturges | |
| 5,953,215 A * | 9/1999 | Karabatsos ................... | 361/767 |
| 6,032,224 A | 2/2000 | Blumenau | |
| 6,072,500 A | 6/2000 | Foran et al. | |
| 6,104,417 A | 8/2000 | Nielsen et al. | |
| 6,115,049 A | 9/2000 | Winner et al. | |
| 6,128,000 A | 10/2000 | Jouppi et al. | |
| 6,137,918 A | 10/2000 | Harrington et al. | |
| 6,188,394 B1 | 2/2001 | Morein et al. | |
| 6,199,150 B1 | 3/2001 | Yoshikawa | |
| 6,204,859 B1 | 3/2001 | Jouppi et al. | |
| 6,249,853 B1 | 6/2001 | Porterfield | |
| 6,362,819 B1 | 3/2002 | Dalal et al. | |
| 6,366,289 B1 | 4/2002 | Johns | |

(Continued)

FOREIGN PATENT DOCUMENTS

| | | |
|---|---|---|
| CN | 101241476 | 8/2008 |
| TW | 498212 | 8/2002 |
| TW | 550591 | 9/2003 |

OTHER PUBLICATIONS

Weikum, G, Data Partitioning and Load Balancing in Parallel Storage System. Jun. 12, 2014. IEEE Thirteenth IEEE Symposium, First International Symposium.

(Continued)

*Primary Examiner* — Abderrahim Merouan

(57) ABSTRACT

Embodiments of the present technology are directed toward techniques for enabling different memory partitions to have different memory depths.

20 Claims, 6 Drawing Sheets

(56) References Cited

U.S. PATENT DOCUMENTS

| | | | |
|---|---|---|---|
| 6,393,504 B1* | 5/2002 | Leung et al. | 710/104 |
| 6,429,877 B1 | 8/2002 | Stroyan | |
| 6,438,062 B1* | 8/2002 | Curtis et al. | 365/230.03 |
| 6,446,158 B1* | 9/2002 | Karabatsos | 711/5 |
| 6,452,595 B1 | 9/2002 | Montrym et al. | |
| 6,469,707 B1 | 10/2002 | Voorhies | |
| 6,480,205 B1 | 11/2002 | Greene et al. | |
| 6,496,916 B1* | 12/2002 | Fadavi-Ardekani et al. | 711/173 |
| 6,526,473 B1* | 2/2003 | Kim | 711/105 |
| 6,584,545 B2 | 6/2003 | Bachmat et al. | |
| 6,614,444 B1 | 9/2003 | Duluk, Jr. et al. | |
| 6,633,297 B2 | 10/2003 | McCormack et al. | |
| 6,681,310 B1 | 1/2004 | Kusters et al. | |
| 6,717,578 B1 | 4/2004 | Deering | |
| 6,833,835 B1 | 12/2004 | van Vugt | |
| 6,879,266 B1* | 4/2005 | Dye | G06F 12/08 341/51 |
| 7,017,068 B2* | 3/2006 | McBride et al. | 713/401 |
| 7,064,771 B1 | 6/2006 | Jouppi et al. | |
| 7,138,295 B2* | 11/2006 | Leedy | 438/109 |
| 7,149,924 B1* | 12/2006 | Zorian et al. | 714/30 |
| 7,158,148 B2 | 1/2007 | Toji et al. | |
| 7,197,662 B2* | 3/2007 | Bullen et al. | 714/6.1 |
| 7,286,134 B1* | 10/2007 | Van Dyke et al. | 345/544 |
| 7,508,398 B1 | 3/2009 | Montrym et al. | |
| 7,512,734 B2 | 3/2009 | Sutardja | |
| 7,620,793 B1* | 11/2009 | Edmondson et al. | 711/208 |
| 7,698,607 B2* | 4/2010 | Willis | 714/710 |
| 7,818,636 B1* | 10/2010 | Sutardja et al. | 714/710 |
| 7,884,829 B1* | 2/2011 | Van Dyke et al. | 345/544 |
| 7,917,671 B2 | 3/2011 | Chilukoor et al. | |
| 7,932,912 B1* | 4/2011 | Van Dyke | 345/544 |
| 8,095,762 B1* | 1/2012 | Schulze et al. | 711/167 |
| 8,146,092 B2 | 3/2012 | Ogawa et al. | |
| 8,281,104 B2 | 10/2012 | Crowther et al. | |
| 8,347,064 B1 | 1/2013 | Glasco et al. | |
| 8,347,065 B1 | 1/2013 | Glasco et al. | |
| 8,352,709 B1 | 1/2013 | Glasco et al. | |
| 8,543,792 B1 | 9/2013 | Glasco et al. | |
| 8,621,176 B2 | 12/2013 | Schindler | |
| 8,661,207 B2 | 2/2014 | Kim et al. | |
| 8,686,977 B2 | 4/2014 | Park et al. | |
| 8,700,883 B1 | 4/2014 | Glasco et al. | |
| 8,706,975 B1 | 4/2014 | Glasco et al. | |
| 8,793,463 B2 | 7/2014 | Moss et al. | |
| 2001/0049766 A1* | 12/2001 | Stafford | 711/103 |
| 2002/0038404 A1* | 3/2002 | Ryan | 711/105 |
| 2002/0083264 A1 | 6/2002 | Coulson | |
| 2002/0140655 A1 | 10/2002 | Liang et al. | |
| 2004/0078700 A1* | 4/2004 | Jeong | 714/42 |
| 2004/0093457 A1* | 5/2004 | Heap | 711/5 |
| 2004/0252547 A1* | 12/2004 | Wang | 365/154 |
| 2004/0257891 A1* | 12/2004 | Kim et al. | 365/200 |
| 2005/0172074 A1 | 8/2005 | Sinclair | |
| 2005/0240745 A1 | 10/2005 | Iyer et al. | |
| 2006/0101218 A1* | 5/2006 | Reed | 711/167 |
| 2006/0277360 A1 | 12/2006 | Sutardja et al. | |
| 2007/0113126 A1* | 5/2007 | Ong | 714/724 |
| 2007/0198722 A1 | 8/2007 | Kottomtharayil et al. | |
| 2008/0091901 A1* | 4/2008 | Bennett et al. | 711/165 |
| 2008/0094924 A1* | 4/2008 | Ross | 365/200 |
| 2008/0126716 A1 | 5/2008 | Daniels | |
| 2009/0049335 A1* | 2/2009 | Khatri et al. | 714/7 |
| 2009/0147598 A1* | 6/2009 | Norman | 365/200 |
| 2009/0248958 A1 | 10/2009 | Tzeng | |
| 2009/0276597 A1* | 11/2009 | Reed | 711/167 |
| 2010/0153680 A1 | 6/2010 | Baum et al. | |
| 2010/0313061 A1* | 12/2010 | Huth et al. | 714/2 |
| 2011/0066792 A1* | 3/2011 | Shaeffer et al. | 711/103 |
| 2011/0072208 A1 | 3/2011 | Gulati et al. | |
| 2011/0087840 A1* | 4/2011 | Glasco | G06F 12/08 711/118 |
| 2011/0141122 A1 | 6/2011 | Hakura et al. | |
| 2011/0145468 A1 | 6/2011 | Diard et al. | |
| 2011/0167229 A1 | 7/2011 | Szalay et al. | |
| 2011/0197039 A1 | 8/2011 | Green et al. | |
| 2011/0231631 A1 | 9/2011 | Matsuzawa et al. | |
| 2011/0246711 A1* | 10/2011 | Koga | 711/103 |
| 2012/0089792 A1* | 4/2012 | Fahs et al. | 711/154 |
| 2012/0185644 A1 | 7/2012 | Kaneko et al. | |
| 2012/0272025 A1 | 10/2012 | Park et al. | |
| 2013/0031328 A1 | 1/2013 | Kelleher et al. | |
| 2013/0100746 A1* | 4/2013 | Rajan et al. | 365/189.05 |

OTHER PUBLICATIONS

Uzi Vishkin, Dynamic Parallel Memories. IP Electronic. Publication Sep. 15, 2005.

IBM, AIX520: Balancing Memory Resources. IP Electronic. Publication Jun. 21, 2003.

Method and System for Direct Memory Access (DMA) to a Logical Partition Memory. IP Electronic. Publication Jun. 4, 2010.

Fuchs, H., Goldfeather, J., Hultquist, J., Spach, S., Austin, J., Brooks, F., Eyles, J., and Pouton, J., Jul. 1985. "Fast Spheres, Shadows, Textures, Transparencies, and Image Enhancements in Pixel-planes," ACM SIGGRAPH Computer Graphics, Proceedings of the 12th annual conference on Computer graphics, vol. 19 Issue 3, 111-120.

* cited by examiner

TECHNIQUES FOR DIFFERENT MEMORY DEPTHS ON DIFFERENT PARTITIONS

BACKGROUND OF THE INVENTION

A number of electronic devices include one or more computing devices such as one or more central, processing units (CPU), one or more graphics processing units (GPU), one or more digital signal processors (DSP), and/or the like. The computing device, herein after simply referred to as a processor, executes computing device readable instructions (e.g., computer programs) and operates on data stored in one or more computing device readable media, herein after simply referred to as memory. To access instructions and data stored in memory, the processor may include one or more memory controllers and one or more memory interfaces. For example, a processor may include a memory controller and four memory interfaces for accessing frame buffer memory, as illustrated in FIG. 1. It is appreciated that the memory interface may be separate from or integral to the memory controller. However, for ease of understanding embodiments of the present technology, the conventional art and embodiments of the present technology will be described with regard to separate memory controllers and memory interfaces. The memory controller generally converts addresses in one memory space to addresses in another memory space. For example, the memory controller may convert logical addresses to physical addresses. The memory interface generally converts addresses in a given memory space to electrical signals to drive address, data and control lines, and receives electrical signals on the address data and control lines, for reading and writing data and/or computer readable instructions to or from the memory.

The processor also includes a number of other functional blocks not shown. For example, the processor may include a plurality of processor cores, one or more communication interfaces, and the like. Processors are well known in the art and therefore those aspects of the processor that are not germane to an understanding of the present technology will not be discussed further.

The performance of the processor is determined by a number of factors, including the amount of memory and the speed at which the memory can be accessed. One common method of improving performance of the processor is to attach the memory to the processor so that a plurality of accesses to memory can be performed substantially together. In one technique, the processor may include a plurality of memory interfaces, each coupled to one or more memory partitions. If each partition is 64 bits wide and there are four partitions, then a memory access to 512 bits can be accessed in two cycles by accessing a first 64 bits in each of the four partitions together and then accessing the next 64 bits in each of the four partitions together. Similarly, a memory access to 636 bits can be performed in three access cycles.

The processor is typically fabricated as an integrated circuit on a monolithic semiconductor substrate (IC chip). However, in other embodiments, the processor may be implemented by a plurality of separate integrated circuits. Typically, the memory is also fabricated as an integrated circuit on a monolithic semiconductor substrate. Usually, each memory partition supported by a processor includes one or more memory integrated circuit chips. For example, each partition of the memory may be implemented by a 256 MB integrated circuit chip.

The integrated circuit of a processor typically includes millions or more semiconductor devices, such as transistors, and interconnects there between. A plurality of processors are fabricated in an array on a wafer. For example, tens, hundreds or thousands of copies of the same processor may be fabricated on a wafer. One or more of the processors on the wafer will include one or more fabrication defects. To increase the fabrication yield from a wafer, a processor that includes a plurality of a given functional block may be configurable to disable one or more of the given functional blocks that includes a manufacturing defect. The device including the one or more of the given functional blocks that have been disabled can then be sold as a lower performance version of the processor. For example, one or more processor chips may include a defect in a particular memory interface, as illustrated in FIG. 2. The memory interface functional block that includes a manufacturing defect may be disabled and sold as a processor supporting 768 MB of frame buffer memory. In comparison, the computing device in FIG. 1, in which all four memory interface are enabled, are sold as processors supporting 1 GB of frame buffer memory.

In practice, manufactures have found it difficult to sell the lower performance versions of the processor. For example, a manufacturer of graphic processors may readily sell the GPUs supporting 1 GB of frame buffer memory, but find it difficult to sell the GPUs that support 768 MB of frame buffer memory even if the reduction does not appreciably affect the performance of the GPU. Accordingly, there is a continuing need for improved memory subsystems in computing devices such as central processing units, graphics processing, units, digital signal processing units, microcontrollers, and the like.

In other cases, a processor may not include manufacturing defects. However, one or more operational functional blocks of the processor may still be selectively disabled for one or more reasons. In such cases, there is a similar continuing need for improved memory subsystems in computing devices such as central processing units, graphics processing, units, digital signal processing units, microcontrollers, and the like.

SUMMARY OF THE INVENTION

The present technology may best be understood by referring to the following description and accompanying drawings that are used to illustrate embodiments of the present technology directed toward techniques for supporting different memory depths on different partitions.

In one embodiment, one or more of a plurality of computing device memory interfaces are disabled and the other memory interfaces are enabled. One or more memory devices are coupled to each of the enabled memory interfaces, and one or more additional memory devices are coupled to a subset of the enabled memory devices. Accordingly, a first depth of memory is coupled to one or more memory interfaces and a second depth of memory is coupled to one or more other memory interfaces. Each of a plurality of physical address ranges are mapped to a corresponding memory interface and a memory space of a corresponding memory device, wherein the physical address ranges of the additional memory devices include a given offset.

In another embodiment, a memory access request at a given physical address is received. A given memory interface and a given location in a corresponding memory device is determined for the given physical address from a mapping of a plurality of physical address ranges to corresponding memory interfaces and the memory space of a memory device of the corresponding memory interfaces, wherein the physical address range of one or more additional memory devices coupled to a subset of enabled memory devices include a given offset. Using the given memory interface, the given location in the corresponding memory device is accessed.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
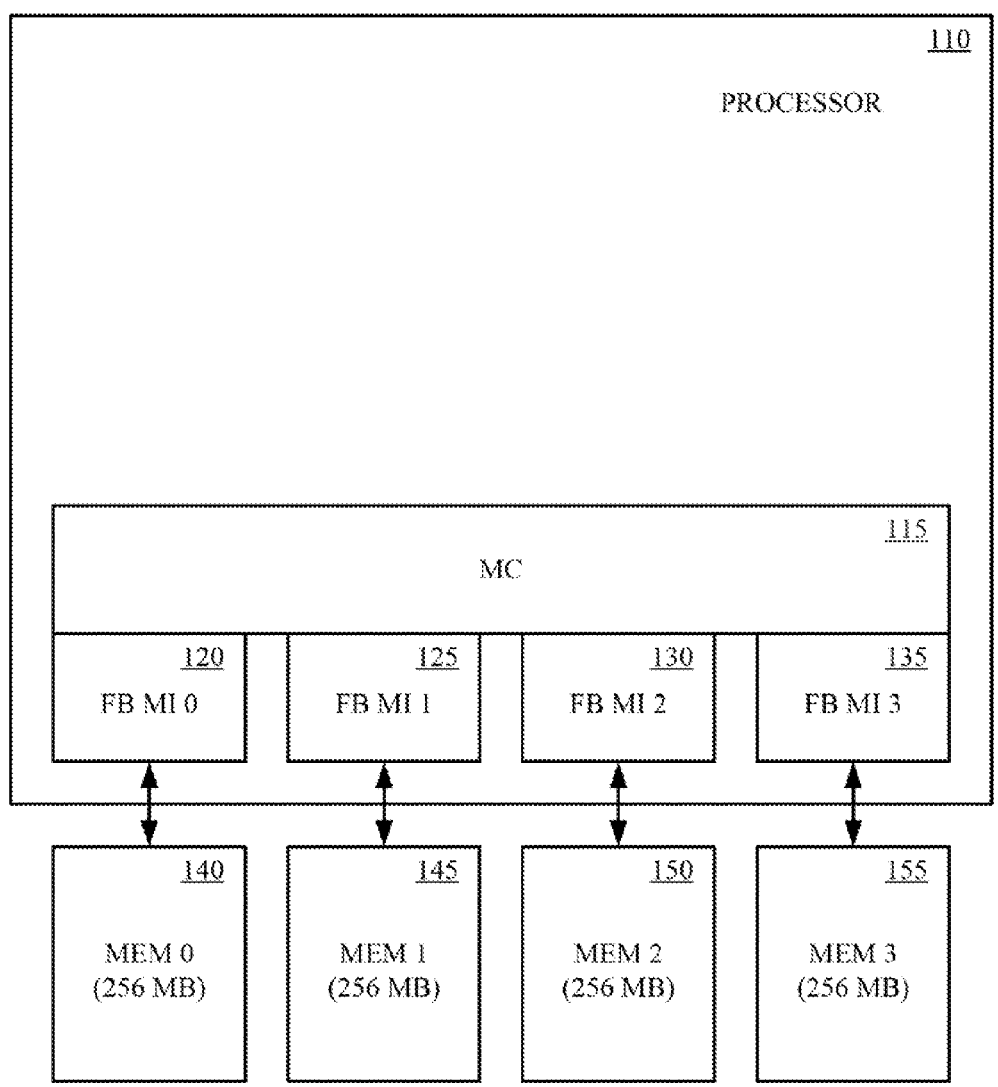
FIG. 1 shows a block diagram of an electronic device including a processor and memory according to one embodiment of the conventional art.
Figure 2:
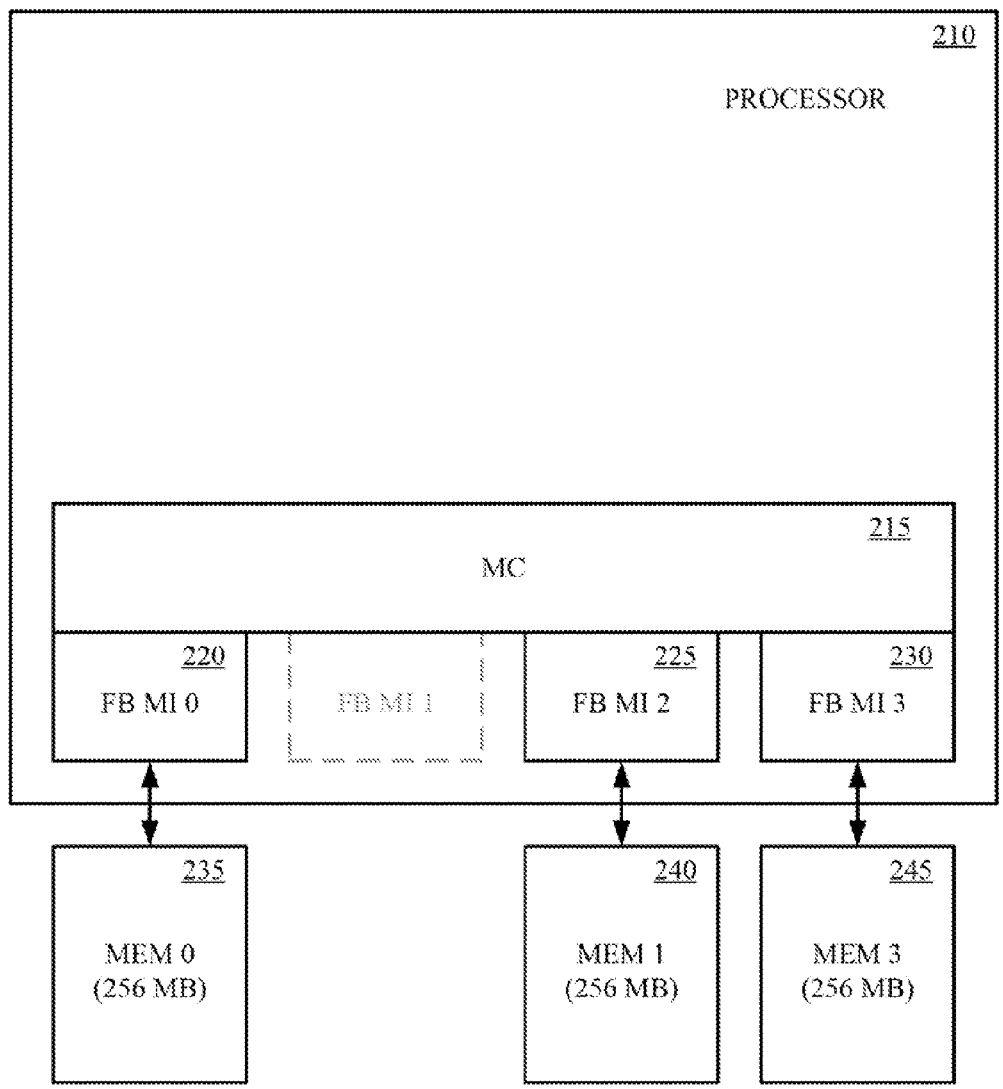
FIG. 2 shows a block diagram of an electronic device including a processor and memory according to another embodiment of the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of one or more electric or magnetic signals capable of being stored, transferred, compared and otherwise manipulated in a electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the action and processes of an electronic device such as an electronic computing device that manipulates and transforms data. The data are represented as physical (e.g., electronic signals) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Figure 3:
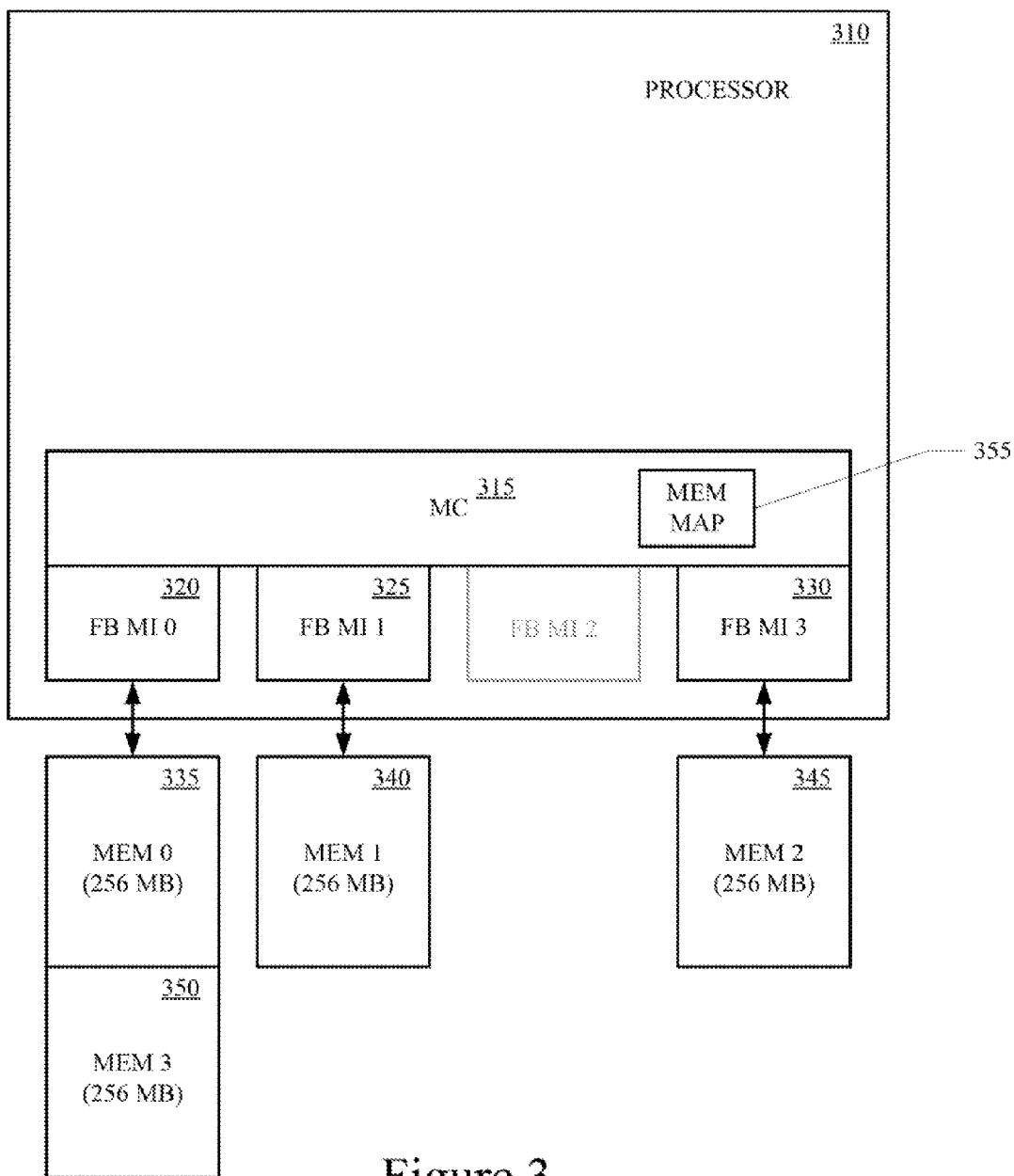
FIG. 3 shows a block diagram of an electronic device including a processor and memory, in accordance with one embodiment of the present technology.

Referring now to FIG. 3, an electronic device including a processor and memory, in accordance with one embodiment of the present technology, is shown. The processor includes one or more memory controllers and a plurality of memory interfaces. One or more of the memory controllers are disabled. In one implementation, the disabled memory controllers include a manufacturing defect. In other implementations, the one or more memory controllers may be disabled for any number of reasons. Each enabled memory interface is coupled to a respective partition including a memory of a given depth. In addition, some of the enabled memory interfaces are coupled to a respective partition including an additional depth of memory. For example, a GPU may include four frame buffer interfaces. The third frame buffer memory interface may be disabled, while the other three frame buffer memory interface are enabled. The three enabled frame buffer memory interfaces are each coupled to 256 MB of memory. In addition, the first frame buffer memory interface is coupled to the additional 256 MB of memory that would have been coupled to the disabled frame buffer memory interface. The memory controller includes a memory map table adapted to support different depths of memory on different memory partitions. The configuration and operation of the electronic device will be further explained with reference to FIGS. 4-6.

Figure 4:
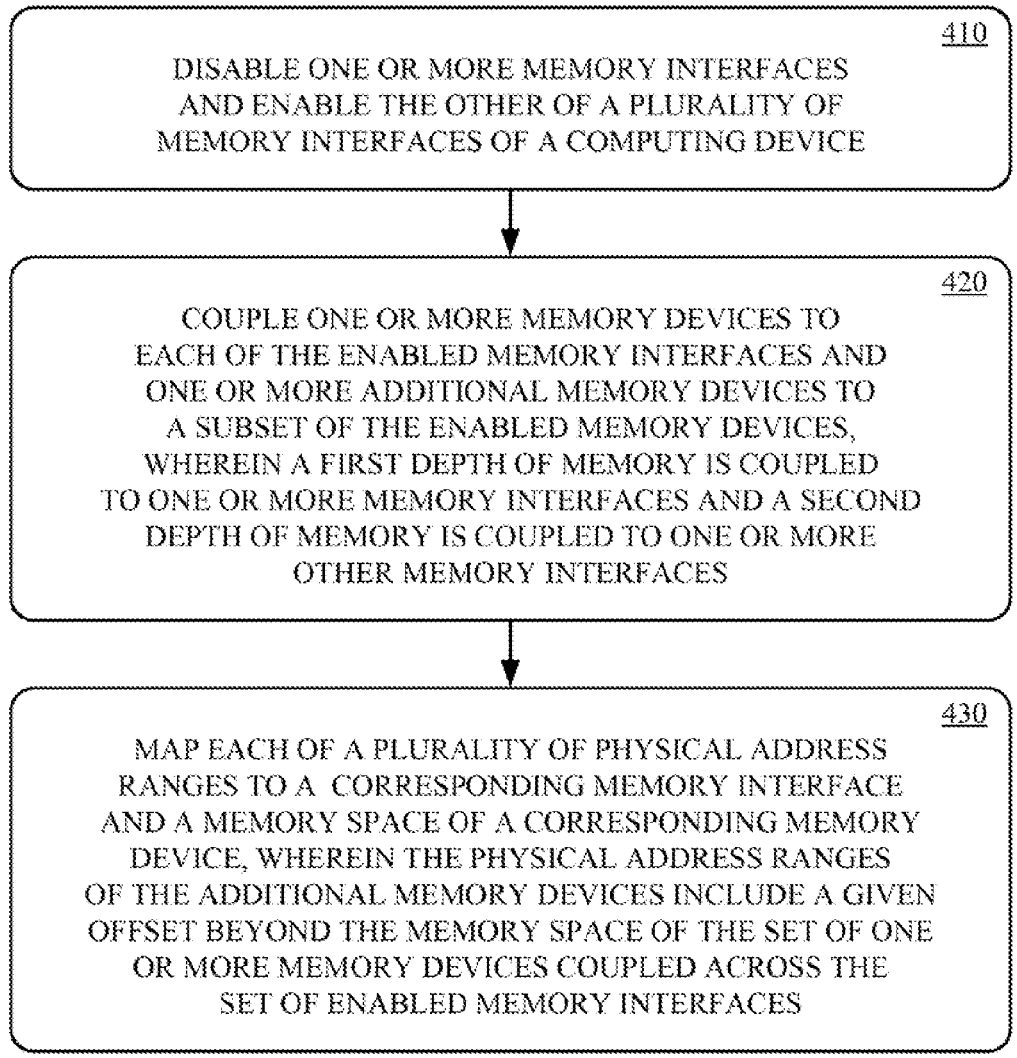
FIG. 4 shows a flow diagram of a method of setting up a processor and memory to support different depths of memory on different memory partitions, in accordance with one embodiment of the present technology.

Referring now to FIG. 4, a method of initializing a processor and memory to support different depths of memory on different memory partitions, in accordance with one embodiment of the present technology. The method may be implemented in hardware, firmware, software or any combination thereof. The processor may be initialized by disabling one or more memory interfaces and enabling the other memory interfaces, at 410. It is also appreciated that initializing of the processor may include disabling one or more other functional blocks, such as a core or communication interface, that include manufacturing defects. In one implementation, one or more memory interfaces of the processor including a manufacturing defect may be disabled. For example, the first, second and fourth frame buffer memory interfaces 320-330 of a processor 310 may be enabled, while the third frame buffer memory interface is disabled because a manufacturing defect adversely affects the operation of the third frame buffer memory interface.

Therefore, the processor 310 effectively has three frame buffer memory interfaces 320-330

At 420, one or more memory devices are coupled to each of the enabled memory interfaces and one or more additional memory devices are coupled to a subset of the enabled memory interfaces. Accordingly, a first depth of memory is coupled to a first set of one or more memory interfaces and a second depth of memory is coupled to a second set of one or more memory interfaces. For example, 256 MB of memory 335-345 may be coupled to each of the first, second and fourth frame buffer memory interfaces 320-330. An additional 256 MB of memory 350 is coupled to the first frame buffer interface 320. Accordingly, the depth of the first memory partition on the first frame buffer memory interface 320 is 512 MB, and the depth of the second and third partition on the second and fourth frame buffer memory interfaces 325, 330 is 256 MB each.

At 430, each of a plurality of physical address ranges are mapped to a corresponding memory interface and a memory space of the corresponding memory interface, wherein the physical address ranges of the one or more additional memory devices include a given offset beyond the memory space of the one or more memory interfaces coupled across the set of enabled memory devices. Accordingly, a non-power of two number of enabled memory interfaces can support a power of two memory space having a non-power of two width across the enabled memory interface. For example, referring to FIG. 6 the first 256 MB of physical address 610 is mapped to the first frame buffer memory interface 615, the second 256 MB of physical address 620 is mapped to the second frame buffer memory interface 625, a third 256 MB of physical address 630 is mapped to the fourth frame buffer memory interface 635. In addition, a fourth 256 MB of physical address 640 at an offset of 8 GB 650 is mapped to the first frame buffer interface. Each memory device may have a width of 64 bits, and therefore the memory width across the enabled memory devices is 192 bits. Furthermore, the frame buffer memory interfaces support a total of 1 GB of memory.

Figure 5:
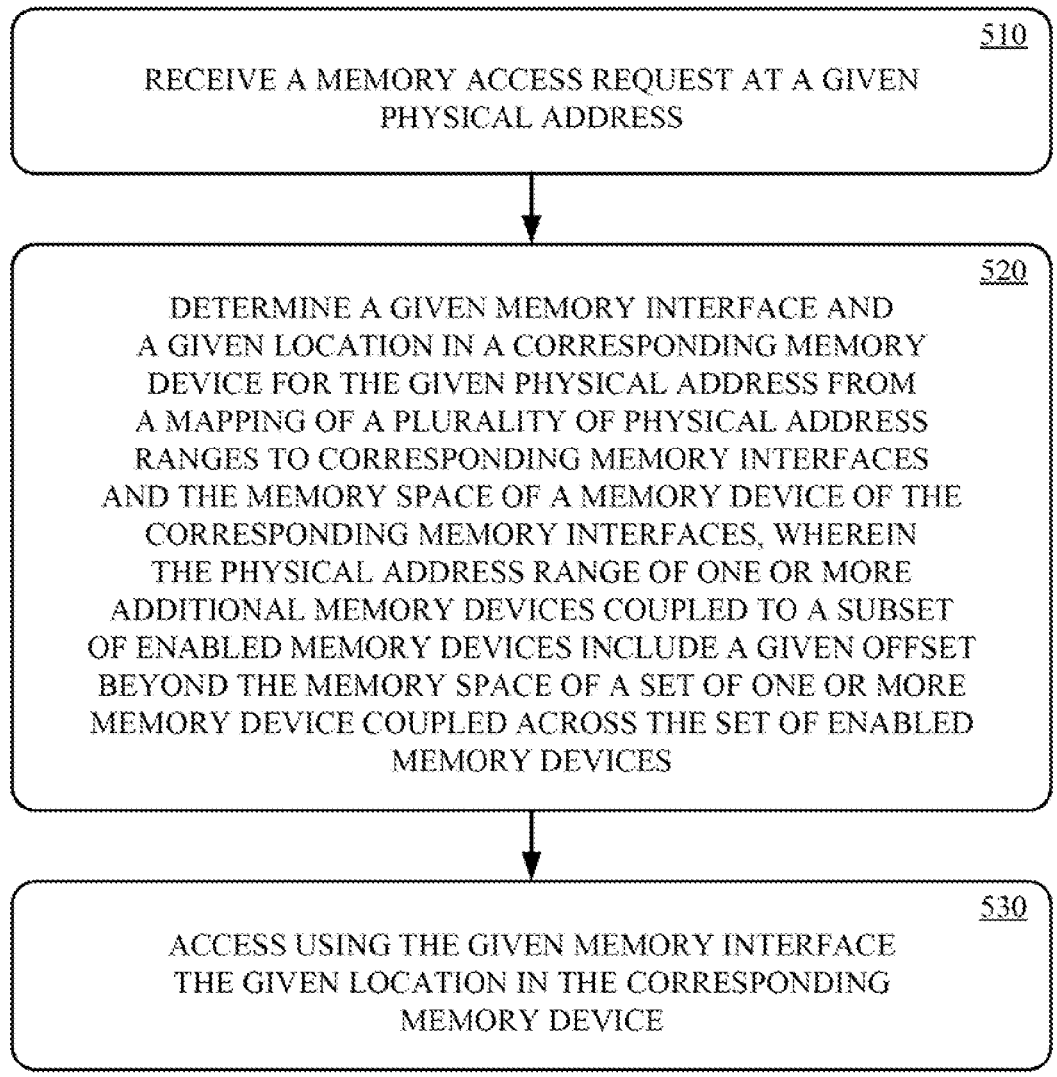
FIG. 5 shows a flow diagram of a method of accessing a memory having different depths in different partitions, in accordance with one embodiment of the present technology.

Referring now to FIG. 5, a method of accessing memory having different depths in different partitions, in accordance with one embodiment of the present technology, is shown. The method may be implemented in hardware, firmware, software or any combination thereof. At 510, a memory access request at a given physical address is received. The memory access request may be a read memory access, a write memory access, an erase memory access and/or the like. In one implementation, the memory access request is received by a memory controller 315. At 520, a given memory interface and a given location in a corresponding memory device for the given physical address is determined from a mapping of a plurality of physical address ranges to corresponding memory interfaces and memory space of a corresponding memory device, wherein the physical address ranges of one or more additional memory devices coupled to a subset of enabled memory devices include a given offset beyond the memory space of a set of one or more memory devices coupled across the set of enabled memory interfaces. In one implementation, the mapping may be stored in a memory mapping table 355 used by the memory controller 315. At 530, the given memory interface is used to access the given location in the corresponding memory device. In one implementation, the memory controller 315 dispatches the memory access request to the given memory interface as determined from the memory mapping table 355.

Figure 6:
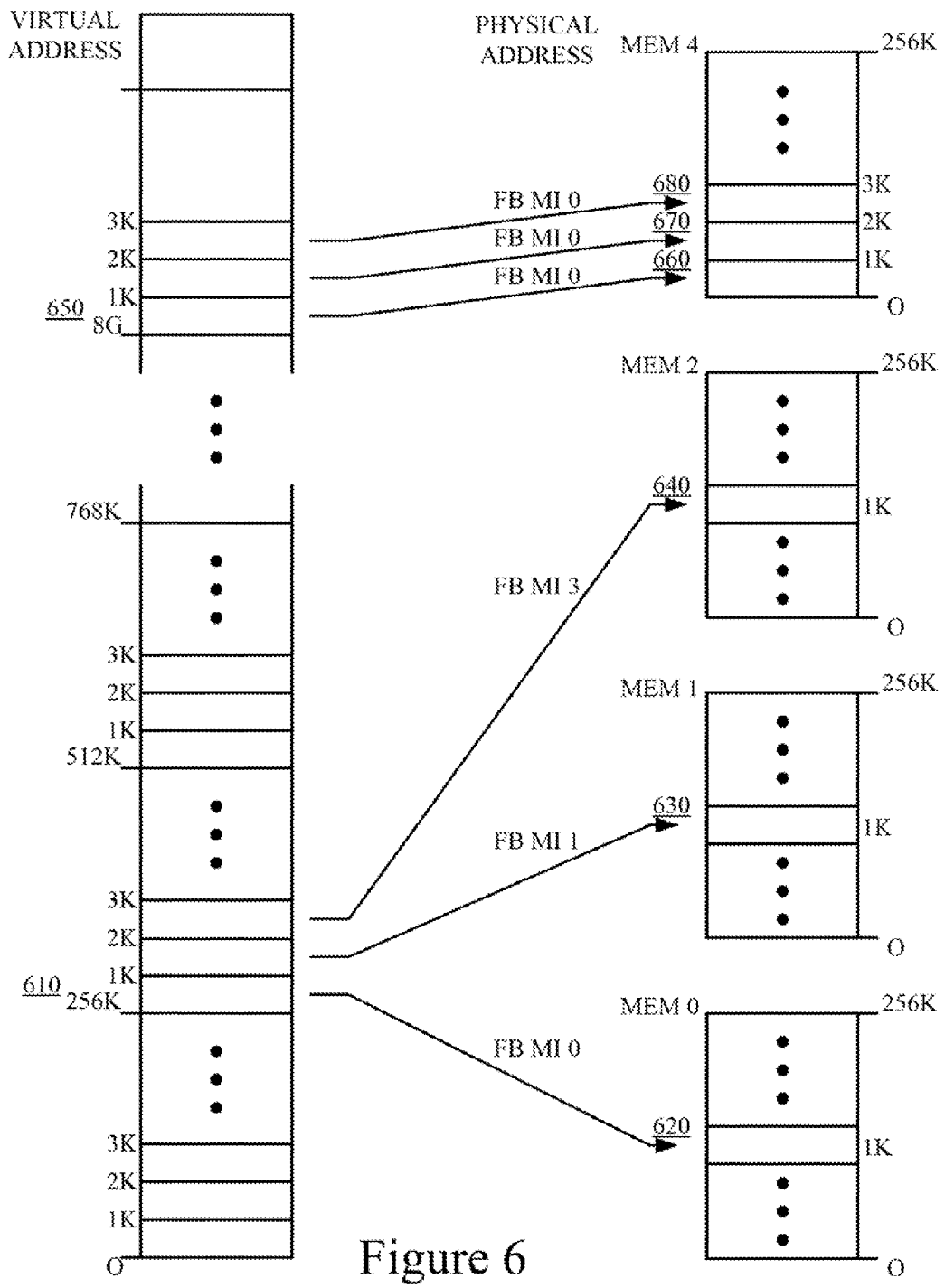
FIG. 6 shows a block diagram illustrating a memory space of a processor supporting different depths on different partitions, in accordance with one embodiment of the present technology.

For example, for a physical address in the first 768 MB of memory the first, second or third frame buffer memory interfaces 320-330 is used to access the corresponding locations in the first, second and third memory devices 335-345. For a physical address including an offset of 8 GB the first frame buffer memory interface 320 is used to access the corresponding location in the fourth memory device 350. It is appreciated that the 768 MB of memory coupled across the set of enabled memory devices may be interleaved by a mapping between the virtual address and the physical address, amongst the three 64-bit wide partitions. In the first 768 MB of memory may be stripped across the first, second and third memory devices 335-345. As illustrated in FIG. 6, a memory access to three 1 KB pages having a starting virtual address of 256K 610 may map to access a 1K page in each 620-640 of the first, second and third memory devices 335-340 using the first, second and third frame buffer memory interfaces 320-330. Because each page is located in a different memory device and is accessed using a different frame buffer memory interface, the three pages can be accessed in parallel during a single memory access cycle. A memory access to three 1 KB pages having a starting virtual address of 8 G 650 may be mapped to access the three 1K pages sequentially 660-680 in the fourth memory device 350 using the first frame buffer memory interface 320. Because each page is located in the same memory device, the three pages are accessed sequentially in the memory access cycles. Accordingly, three quarters of the total memory capacity can be accessed at the peak speed provided for by the first 256 MB of each of the three partitions coupled across the enabled memory interfaces. The other 256 MB in the first partition can be accessed at one third the peak speed.

The memory is mapped twice, once for all three partitions, and once for mapping one partition. Software may use the memory mapping table 355 to restrict access to only part of the memory for each address range. For example, the first 768 MB is spread over the entire address space of the second and third memory partitions and half of the address space of the first partition. For the second 768 MB, the address is to the second half of the first partition, but aliases to the second and third partitions. The second 768 MB is prevented from use by the software using the memory mapping table 355. The second memory map, at an offset of 8 GB, maps the first partition. Here, the first 256 MB aliases with the lower 768 MB, and is prevented from use by the software using the memory mapping table 355. The upper 256 MB of the first partition can be accessed, giving a total memory capacity of 1 GB (e.g., 768 MB+256 MB).

Accordingly, embodiments of the present technology advantageously allow different memory partitions to have different memory depths. This allows a memory system to advantageously support a memory size that is not a multiple of the memory width. For example, a 192-bit memory subsystem, having three 64-bit wide partitions, could have 256 MB in two partitions, and 512 MB in one partition, allowing the 192 bits to support 1 GB of frame buffer memory.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   disabling one or more memory interfaces of a plurality of memory interfaces and enabling the other memory interfaces of the plurality of memory interfaces of a computing device;
   coupling one or more memory devices to each of the enabled memory interfaces, coupling one or more additional memory devices to a subset of the enabled memory interfaces, and not coupling any memory device to each of the disabled memory interface, wherein a first depth of memory is coupled to a first set of enabled memory interfaces and a second depth of memory is coupled to a second set of enabled memory interfaces, and wherein the first depth is different from the second depth; and
   mapping each of a plurality of physical address ranges to a corresponding enabled memory interface and a memory space of a corresponding memory device, wherein the physical address ranges of the one or more additional memory devices includes a given offset.

2. The method according to claim 1, wherein the given offset is beyond the memory space of the set of one or more memory devices coupled across the set of enabled memory interfaces.

3. The method according to claim 1, wherein the memory width of the set of one or more memory devices coupled across the set of enable memory interfaces is a non-power of two.

4. The method according to claim 1, wherein the computing device comprises a graphics processing unit.

5. The method according to claim 4, wherein the plurality of memory interfaces comprise frame buffer memory interfaces.

6. The method according to claim 1, wherein the one or more disabled memory interfaces include a manufacturing defect.

7. A method comprising:
   receiving a memory access request at a given physical address;
   determining a given memory interface and a given location in a corresponding memory device for the given physical address from a mapping of a plurality of physical address ranges to corresponding memory interfaces and the memory space of a memory device of the corresponding, memory interfaces,
      wherein one or more memory devices are coupled to each of a plurality of enabled memory interfaces, one or more additional memory devices are coupled to a subset of the plurality of enabled memory interfaces, and no memory device are coupled to each of one or more disabled memory interfaces,
      wherein a first depth of memory is coupled to as first set of one or more enabled memory interfaces, a second depth of memory is coupled to a second set of one or more enabled memory interfaces, and the first depth is different from the second depth, and
      wherein the physical address range of the one or more additional memory devices coupled to the subset of the plurality of enabled memory interfaces include a given offset; and
   accessing, using the given memory interface, the given location in the corresponding memory device.

8. The method according to claim 7, wherein the given offset is beyond the memory space of a set of one or more memory devices coupled across the set of enabled memory interfaces.

9. The method according to claim 7, wherein the memory width of the set of one or more memory devices coupled across the set of enabled memory interfaces is a non-power of two.

10. The method according to claim 7, wherein the computing device comprises a graphics processing unit.

11. The method according to claim 10, wherein the plurality of memory interfaces comprise frame buffer memory interfaces.

12. A method comprising:
    an initialization phase including;
       disabling one or more memory interfaces of a plurality of memory interfaces and enabling the other memory interfaces of the plurality of memory interfaces of a computing device;
       coupling one or more memory device to each of the enabled memory interfaces, enabling one or more additional memory devices to a subset of the enabled memory interfaces and not coupling any memory device to each of the one or more disabled memory interfaces, wherein a first depth of memory is coupled to a first set of enabled memory interfaces, a second depth of memory is coupled to a second set of enabled memory interfaces and the first depth is different from the second depth; and
       mapping each of a plurality of physical address ranges to a corresponding enabled memory interface and a memory space of a corresponding, memory device, wherein the physical address ranges of the one or more additional memory devices includes a given offset; and
    an operating phase including;
       receiving a memory access request at a given physical address;
       determining a given memory interface and a given location in a corresponding memory device for the given physical address from the mapping of each of a plurality of physical address ranges to a corresponding enabled memory interface and a memory space of a corresponding, memory device, wherein the physical address ranges of the one or more additional memory devices includes a given offset; and
       accessing, using the given memory interface, the given location in the corresponding memory device.

13. The method according to claim 12, wherein the given offset is beyond the memory space of the set of one or more memory devices coupled across the set of enabled memory interfaces.

14. The method according to claim 12, wherein the memory width of the set of one or more memory devices coupled across the set of enable memory interfaces is a non-power of two.

15. The method according to claim 12, wherein the computing device comprises a graphics processing unit.

16. The method according to claim 15, wherein the plurality of memory interfaces comprise frame buffer memory interfaces.

17. The method according to claim 12, wherein the one or more disabled memory interfaces include a manufacturing defect.

18. The method according to claim 12, wherein the memory access request is received by a memory controller.

19. The method according to claim 18, wherein the memory controller determines the given memory interface and the given location in the corresponding memory device for the given physical address from the mapping.

20. The method according to claim 12, wherein initialization phase is performed by a manufacturer of the computing device.

* * * * *